United States Patent
Schüler et al.

(10) Patent No.: US 7,114,778 B2
(45) Date of Patent: Oct. 3, 2006

(54) DRIVE HAVING A SLIDING ELEMENT FOR A VEHICLE SEAT ADJUSTER

(75) Inventors: Rolf Schüler, Heiligenhaus (DE); Jürgen Stemmer, Remscheid (DE); Rainer Messerschmidt, Düsseldorf (DE); Michael Berres, Leverkusen (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 109 days.

(21) Appl. No.: 10/954,142

(22) Filed: Sep. 30, 2004

(65) Prior Publication Data

US 2005/0067871 A1   Mar. 31, 2005

Related U.S. Application Data

(63) Continuation of application No. PCT/EP03/13531, filed on Dec. 2, 2003.

(30) Foreign Application Priority Data

Dec. 21, 2002   (DE) ................. 102 60 548
Oct. 21, 2003   (DE) ................. 103 48 823

(51) Int. Cl.
    *B60N 2/02* (2006.01)
(52) U.S. Cl. .................................... 297/367
(58) Field of Classification Search ............ 297/361.1, 297/366, 367, 368
    See application file for complete search history.

(56) References Cited

U.S. PATENT DOCUMENTS

| 3,897,608 | A | | 8/1975 | Impicciche | |
|---|---|---|---|---|---|
| 5,634,380 | A | | 6/1997 | Scholz et al. | |
| 5,816,656 | A | | 10/1998 | Hoshihara et al. | |
| 5,899,533 | A | * | 5/1999 | Tatematsu et al. | 297/367 |
| 6,102,480 | A | * | 8/2000 | Asano | 297/366 |
| 6,142,569 | A | * | 11/2000 | Kidokoro et al. | 297/366 |
| 6,283,886 | B1 | | 9/2001 | Schumann | |
| 6,318,805 | B1 | * | 11/2001 | Asano | 297/367 |
| 6,619,743 | B1 | | 9/2003 | Scholz et al. | |
| 6,883,869 | B1 | * | 4/2005 | Liu et al. | 297/367 |

FOREIGN PATENT DOCUMENTS

| DE | 195 08 328 A1 | 9/1996 |
|---|---|---|
| DE | 195 17 441 C1 | 10/1996 |
| DE | 197 37 637 A1 | 3/1998 |
| DE | 198 47 081 A1 | 4/2000 |
| EP | 1 002 691 A2 | 5/2000 |
| GB | 893419 A | 4/1962 |
| GB | 2 117 441 A | 10/1983 |

* cited by examiner

*Primary Examiner*—Milton Nelson, Jr.
(74) *Attorney, Agent, or Firm*—Womble Carlyle Sandridge & Rice, PLLC

(57) ABSTRACT

In a drive (1) for a vehicle seat adjuster (3), having a manually pivotable drive lever (15), which can be deflected out of a neutral position in order, after an element (35) has engaged in a drive wheel (51), to produce a directed rotational movement of an output element (63), at least one sliding element (35) which is moveable in a translatory manner is provided as the element which is to be engaged.

25 Claims, 10 Drawing Sheets

DRIVE HAVING A SLIDING ELEMENT FOR A VEHICLE SEAT ADJUSTER

CROSS-REFERENCE TO RELATED APPLICATION

The present application is a continuation of PCT/EP03/013531, which was filed Dec. 2, 2003, and is incorporated herein by reference, in its entirety.

BACKGROUND OF THE INVENTION

The present invention relates to a drive for a vehicle seat adjuster having a manually pivotable drive lever that can be deflected out of a neutral position in order to produce a directed rotational movement of an output element after an element has engaged in a drive wheel.

DE 198 47 081 A1 discloses a drive of the type described in the immediately preceding paragraph, the drive lever of which pivots a tilting element having two toothed regions integrally formed on it, one of the toothed regions, depending on the pivoting direction, engaging in a drive wheel, by means of direct meshing, and then this drive wheel being rotated in one direction, with the force flux between the drive lever and the drive wheel taking place via the tilting element. A brake device which is arranged between the drive wheel and output element absorbs a torque on the output side and only lets through a torque on the drive side, i.e. during the return of the drive lever into the neutral position the brake device firmly holds the drive wheel. With renewed deflection of the drive lever, the drive wheel can be rotated further. In addition, an overload safeguard is provided between the drive wheel and the brake device and, when a limit load is exceeded, separates the drive wheel from the brake device and the output element.

BRIEF SUMMARY OF SOME ASPECTS OF THE INVENTION

The present invention is based on the object of improving a drive of the type described above. This object is achieved according to the present invention by a drive for a vehicle seat adjuster having at least one sliding element mounted for moving in a translatory manner into engagement with a drive wheel, a drive lever mounted for being manually pivoted, and an output element mounted for rotating in response to the drive lever being pivoted while the sliding element is in engagement with the drive wheel. In accordance with illustrated embodiments of the present invention, the sliding element is more specifically mounted for moving in the translatory manner and into engagement with the drive wheel in response to the drive lever being pivoted, and the drive lever is mounted for being manually pivoted relative to the sliding element.

Because the sliding element, which can be moved in the translatory manner, is provided as the element which is to be engaged and via which the transfer of force between the drive lever and drive wheel takes place, a single region of the sliding element can be engaged to the drive wheel for facilitating movement in both possible driving directions. This saves on construction space, and so a compact drive is possible. For special applications, a plurality of sliding elements may also be provided. The sliding element is preferably guided in the radial direction of the drive wheel in order to carry out a defined movement during the engagement process. During the engagement process, the sliding element preferably enters into engagement with the drive wheel, preferably by meshing. The guide for the sliding element is preferably formed on a carrier plate, which is held frictionally in a fixed position only during the engagement process, so that the empty travel during the engagement process is as small as possible.

For the conversion of the pivoting movement of the drive lever into the translatory movement of the sliding element, a rotational element is preferably provided. The rotational element is rotated by the drive lever and acts via a control contour on the sliding element. The control contour converts the rotational movement of the rotational element into a translatory movement of the sliding element. The rotational element may also be used for converting the pivoting movement of the drive lever by the drive lever preferably acting on the rotational element via a teeth geometry having involutes, i.e. a rolling movement occurring which, when there is an appropriate distance between the common contact point and the particular pivot axis, permits an enlargement of the pivoting angle.

If, in one preferred variant, during the return of the drive lever into the neutral position, the drive lever disengages the engaged sliding element again by means of a control teeth, the number of springs used can be reduced, since a spring is not required for the disengagement process, with the result that, ultimately, a system of a large number of springs interacting precisely with one another is no longer necessary. This reduces the production costs and at the same time saves construction space otherwise needed by the springs for their deflection.

The control teeth preferably has a control segment, which is connected to the drive lever and ensures a direct conversion of the deflecting movement, and a rotatable control wheel which then acts on the element to be disengaged, for example by means of a control cam, which is round for the purpose of making contact in a manner independent of direction, and a control slope, so that, for example, a preferred rotational movement of the control wheel is converted into a translatory movement of the element to be disengaged. The control cam may be designed as an individual part or may be integrally formed, for example on the control wheel.

An overload safeguard is preferably provided between the drive wheel and the output element and, when a limit value is exceeded, separates the drive wheel from the output element and therefore avoids damage to the components. The overload safeguard preferably lies in the force flux during the transmission of torque and is based on a frictional principle, so that an unambiguous and complete severing of the drive side is ensured. Any desired design which is known per se may be used for the overload safeguard, but a radially severing system is preferred.

The use of a self-locking gear which blocks a torque on the output side and lets through a torque on the drive side has the advantage that a separate brake device does not to be provided in the drive in order to block the output side in the unactuated state and during the return of the drive lever into the neutral position.

The drive according to the invention can be used for all possible vehicle seat adjusters, but it can more specifically be used for height adjusters, backrest adjusters or diverse inclination adjusters which are provided in a correspondingly adjustable vehicle seat.

BRIEF DESCRIPTION OF THE DRAWINGS

The invention is explained in greater detail below with reference to two exemplary embodiments which are illustrated in the drawings, in which.

DETAILED DESCRIPTION OF THE INVENTION

Figure 1:
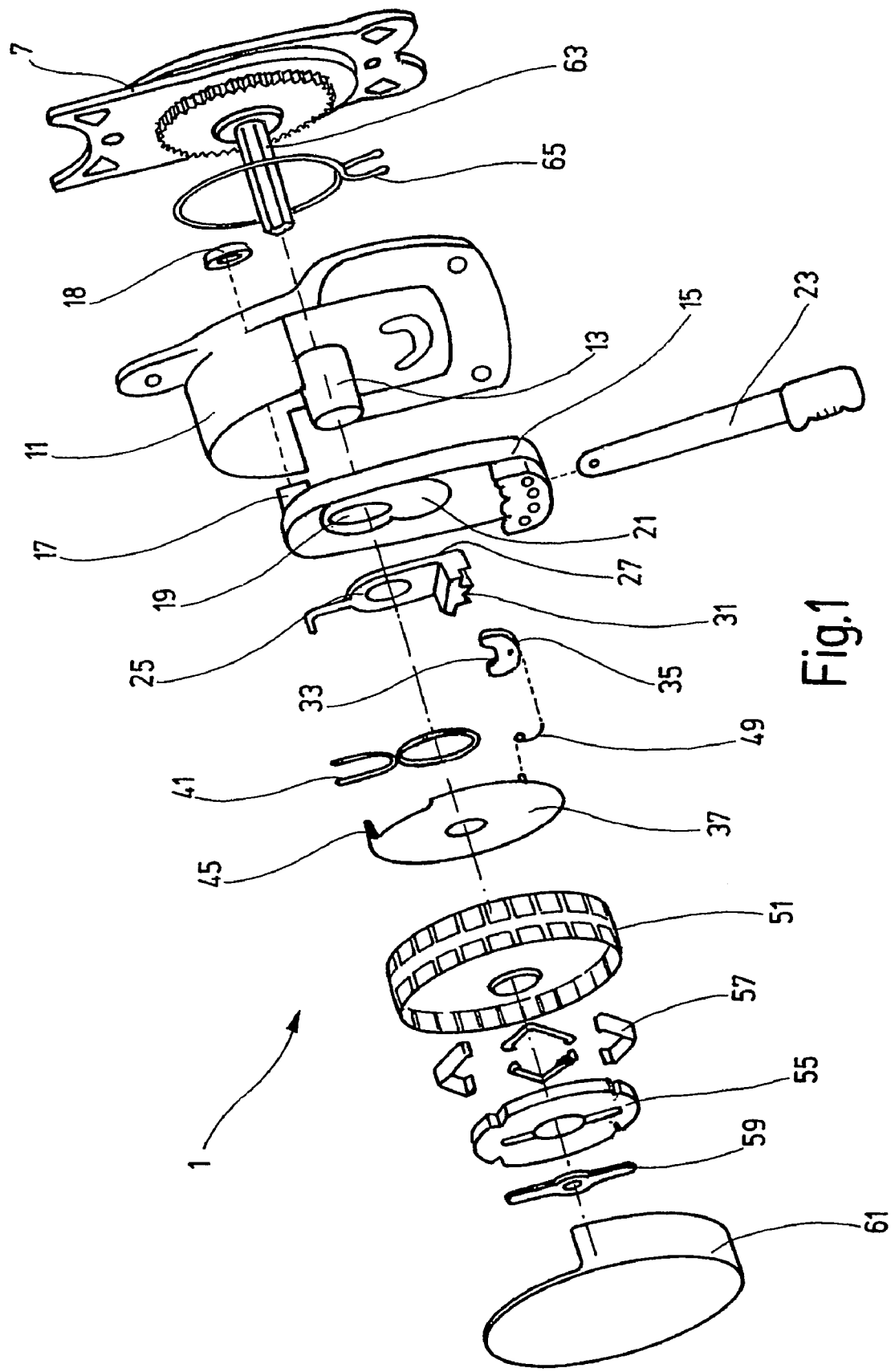
FIG. 1 is an exploded illustration of the first exemplary embodiment together with the gear.
Figure 2:
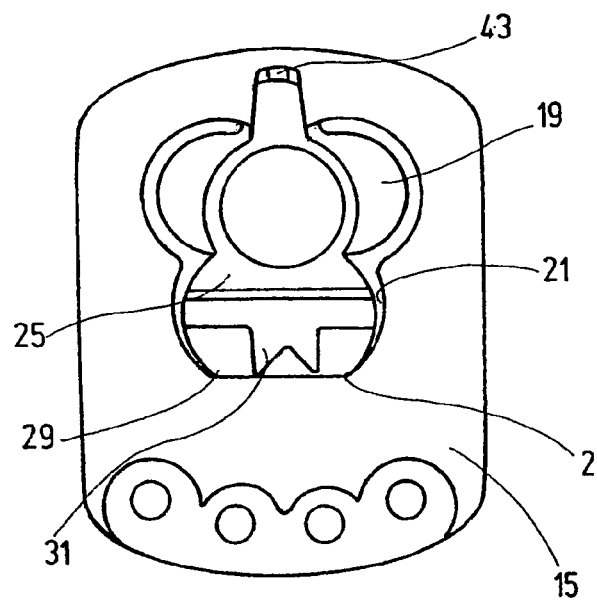
FIG. 2 is a view of the drive lever and of the rotational element in the neutral position in the direction looking at the gear.
Figure 3:
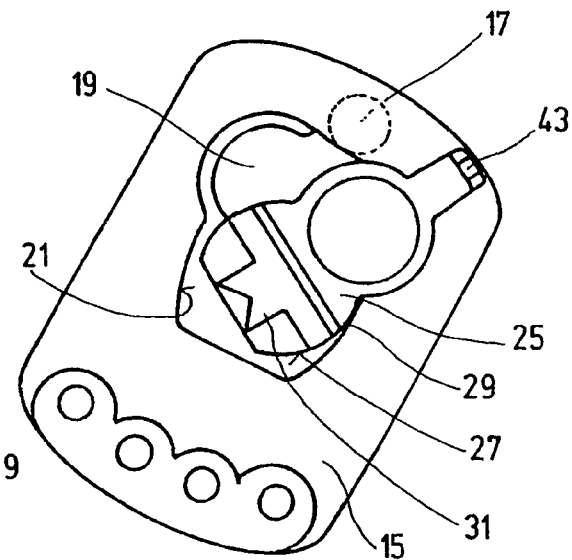
FIG. 3 is an illustration corresponding to FIG. 2 in the deflected position.
Figure 4:
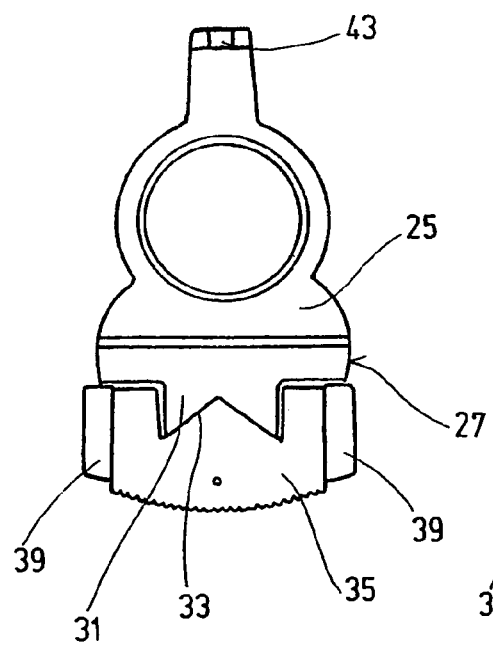
FIG. 4 is a view of the rotational element and of the sliding element in the neutral position in a direction looking at the gear.
Figure 5:
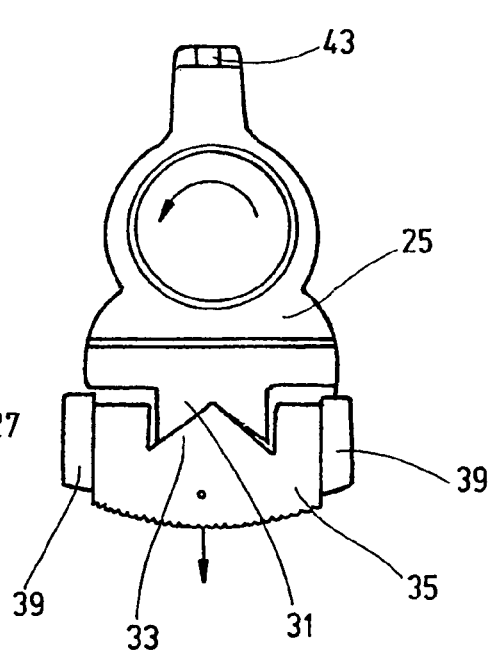
FIG. 5 is an illustration corresponding to FIG. 4 after the engagement of the sliding element.
Figure 6:
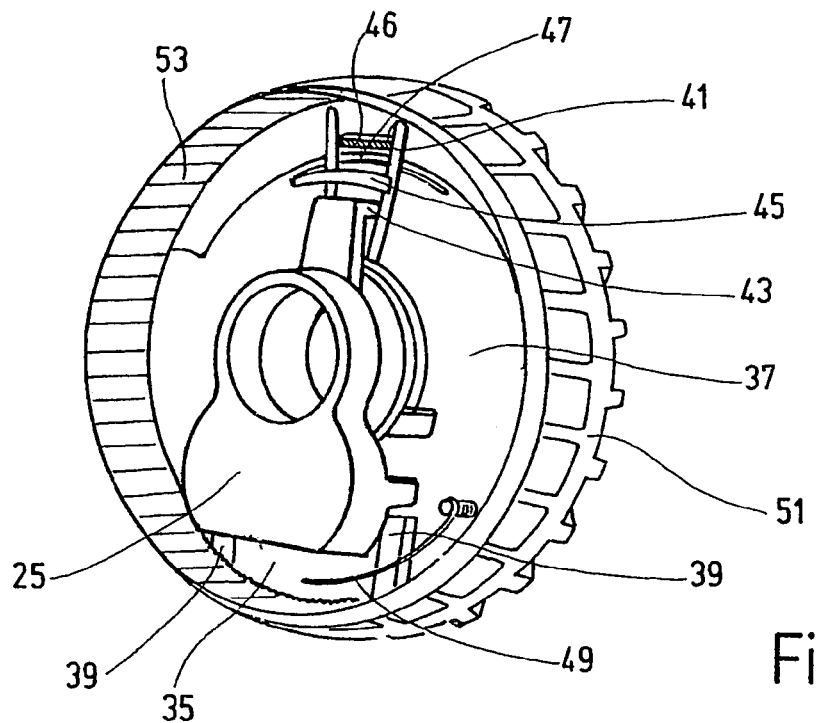
FIG. 6 is a perspective view of the rotational element, sliding element, carrier plate and drive wheel in the direction looking away from the gear.
Figure 7:
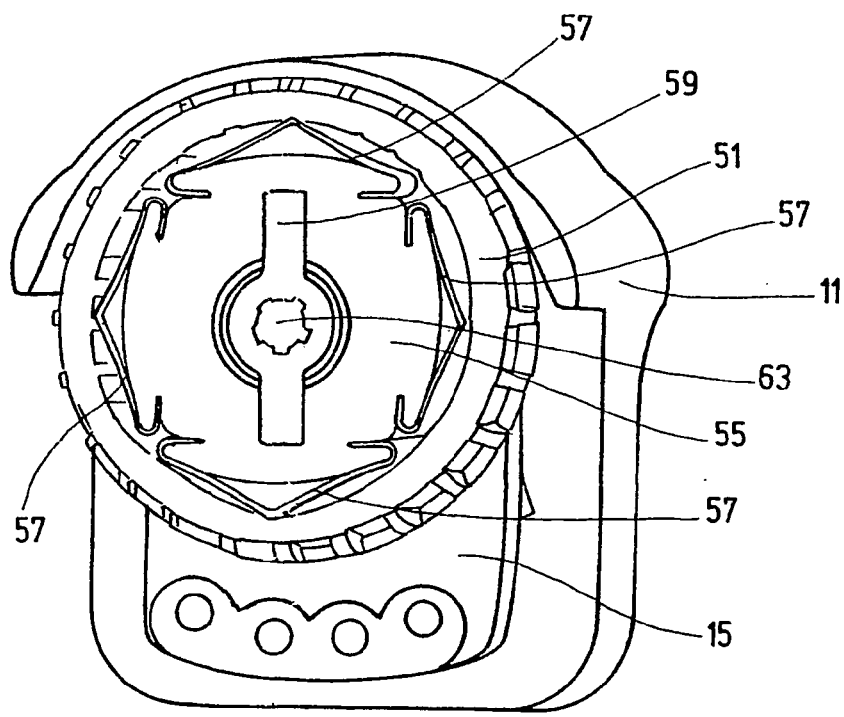
FIG. 7 is a perspective view of the overload safeguard, drive wheel, drive lever and housing in the direction looking at the gear.
Figure 8:
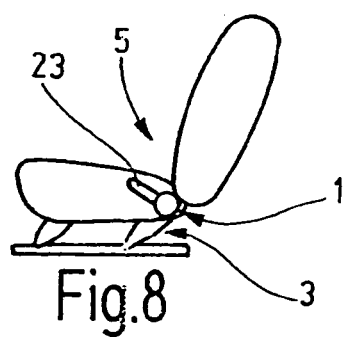
FIG. 8 is a schematic side view of a vehicle seat.
Figure 9:
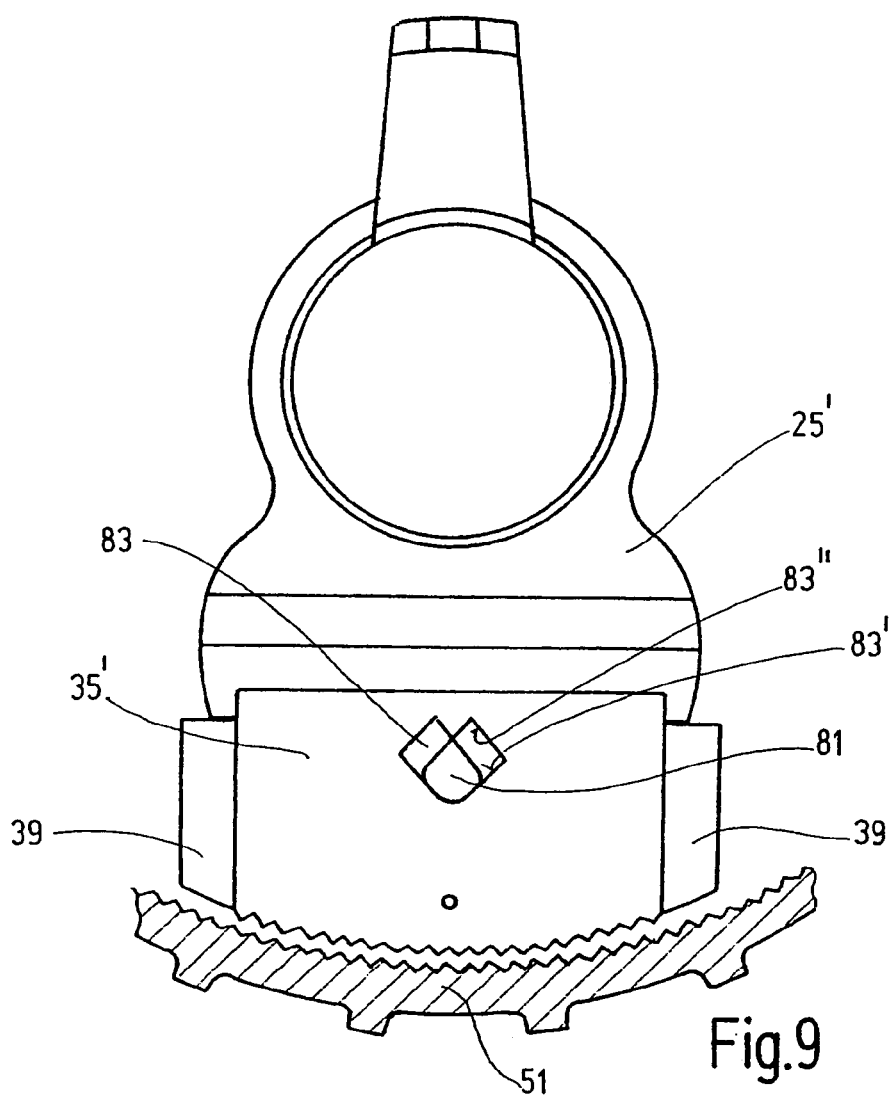
FIG. 9 is an illustration corresponding to FIG. 4 of one modification in the neutral position.
Figure 10:
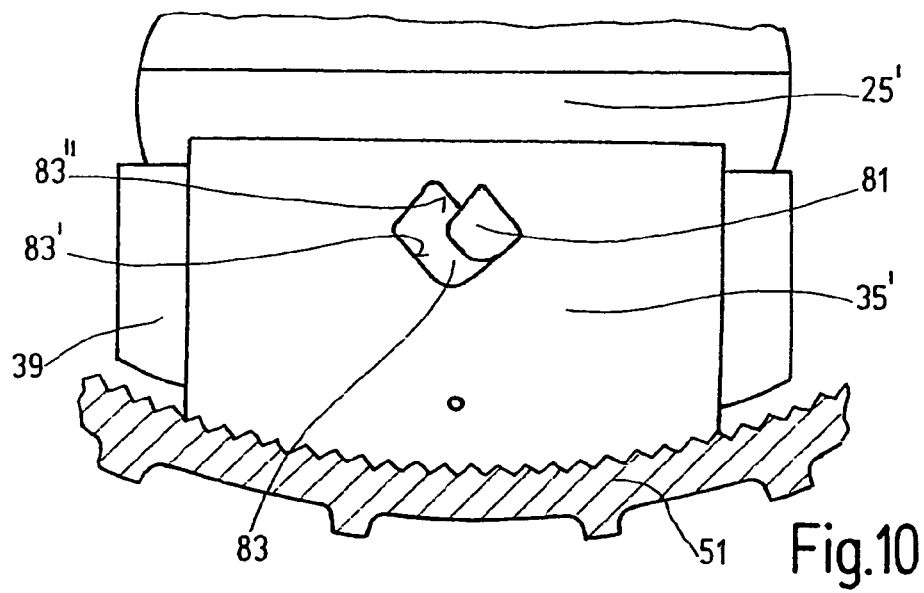
FIG. 10 is an illustration corresponding to FIG. 9 after the engagement of the sliding element.

A drive 1 of the first exemplary embodiment is provided for a vehicle seat adjuster 3 which serves, in the first exemplary embodiment, as a height adjuster of a vehicle seat 5 in a motor vehicle. The drive 1 acts on a gear 7. In the first exemplary embodiment, the gear 7 is a self-locking gear fitting which respectively moves, via its two fitting parts which can be rotated relative to each other, two parts of the vehicle seat adjuster 3 relative to each other. In the first exemplary embodiment, the two parts of the vehicle seat adjuster 3 which are moved relative to each other by the gear 7 (e.g., the self-locking gear fitting) are, for example, the seat frame and a rocker (e.g., a pivotable leg that partially carries the seat frame). The gear 7 blocks a torque applied to the output side of the gear 7. That is, the gear blocks a torque applied to the gear 7 by the vehicle seat adjuster 3. On the other hand, a torque applied to the drive side of the gear 7 rotates the gear 7. That is, a torque applied to the gear 7 from the drive 1 rotates the gear 7.

In the following, the neutral position of the drive 1 is described first. The drive 1 has a half open housing 11 which defines a cylindrical construction space. In the center of this construction space, a bearing sleeve 13 is integrally formed on the housing 11 and defines the cylindrical coordinates used below. A drive lever 15 is mounted pivotably in the housing 11 by means of an integrally formed bearing journal 17 which is arranged offset from and parallel to the bearing sleeve 13. The bearing journal 17 is secured on the outside of the housing 11 by a ring clip 18. The drive lever 15 surrounds the bearing sleeve 13 with a large amount of play by means of an elongated hole 19. On the side of the drive lever 15 which faces away from the bearing journal 17, a curved bearing surface is provided on both sides of the connecting line running radially from the bearing journal 17 to the elongated hole 19, as an external involute 21. A lever arm 23, for example protruding radially, is fastened to the drive lever 15 as an extension that is for actuating the drive lever 15.

In the area that is to the side of the drive lever 15 which faces axially away from the housing 11, a rotational element 25 is mounted rotatably on the bearing sleeve 13. That is, the drive lever 15 and rotational element 25 are mounted on different axes. In order to form a toothed geometry with involutes between the drive lever 15 and the rotational element 25, the rotational element 25 has, on both sides, an internal involute 27 which bears at a contact point 29 against the associated external involute 21. The rotational element 25 has a fork-shaped control contour 31 with two wedges. With this control contour 31, the rotational element 25 acts, in a manner described in greater detail below, on a cam 33 of a sliding element 35 which can be moved in a translatory manner.

In the area that is to the side of the rotational element 25 which faces axially away from the drive lever 15, a disc-shaped carrier plate 37 is likewise mounted rotatably on the bearing sleeve 13. The carrier plate 37 has two radially running, lateral guides 39 for the sliding element 35 which can be moved in the radial direction. A coupling spring 41, which is formed in the manner of a ring with spring ends which are angled radially outwards and protrude approximately parallel, is arranged between the rotational element 25 and the carrier plate 37 and mounted rotatably on the carrier plate 37. In the neutral position, the two spring ends of the coupling spring 41 are supported, firstly, on a first spring support 43 of the rotational element 25 and, furthermore, on a second spring support 45 of the carrier plate 37, and finally also on a third spring support 46 of the housing 11. A spring shackle 47, which is integrally formed on the edge of the carrier plate 37, protrudes from the carrier plate 37 approximately in the region of the spring supports 43 and 45 and bears against the housing 11. Finally, a sliding-element spring 49, which is hooked at one end into the sliding element 35 and pulls the latter radially inwards, is also mounted on the carrier plate 37.

In the area that is to the side of the carrier plate 37 which faces axially away from the rotational element 25, a drive wheel 51, which is designed as a toothed ring, is mounted rotatably on the bearing sleeve 13. The drive wheel 51 is of partially hollow design on both sides and therefore engages over the carrier plate 37 and the rotational element 25. A toothed ring 53 is formed on the resultantly defined inner wall of the drive wheel 51. Teeth of the sliding element 35 can interact with the teeth 53 of the drive wheel, but, in the neutral position, the sliding element 35 is spaced apart from the teeth 53 of the drive wheel 51.

On that side of the drive wheel 51 which faces axially away from the carrier plate 37, an overload ring 55 is mounted rotatably on the drive wheel 51 (or optionally on the bearing sleeve 13), but is connected frictionally to the drive wheel 51 by four leaf springs 57, which are bent approximately in a triangular manner, by means of corresponding contact slopes on the drive wheel 51. On that side of the overload ring 55 which faces axially away from the drive wheel 51, a compensating element 59 is inserted into the overload ring 55 and connected in a rotationally fixed manner by a form-fitting connection. A cover 61, which is screwed or connected fixedly in some other way to the housing 11, is adjacent to the side of the overload ring 55 which faces away from the drive wheel 51.

An output element 63, which is arranged within the bearing sleeve 13 and is designed as a short shaft, sits at one end in a rotationally fixed manner in the compensating element 59 and at the other end in a rotationally fixed manner in the gear 7. Furthermore, a restoring spring 65 is arranged between the housing 11 and the gear 7 and is mounted on the outside of the housing 11. The restoring spring 65 is designed in the manner of a ring having spring ends which are angled radially outwards and protrude approximately parallel. A projection which protrudes axially from the drive lever 15 and projects through a slotted guide of the housing 11 is clamped between the two spring ends of the restoring spring 65, with the result that the restoring spring pivots the drive lever 15 back into its neutral position after an actuation.

The drive 1 is preassembled and then placed together with the output element 63 onto the gear 7 and connected to the latter, for which purpose fastening regions are preferably provided on the housing 11.

The drive 1 can be used to step up a pumping (i.e., back and forth) movement of the lever arm 23 of the drive lever 15 and convert it into a directed rotational movement of the gear 7. When the drive lever 15 is deflected from the neutral position into a deflected position, it pivots about its bearing journal 17. As a result of its shape, the internal involute 27 executes a rolling movement on the external involute 21, in which case the contact point 29 migrates and the rotational element 25 rotates about the bearing sleeve 13. The selected dimensioning gives rise to a step-up in the pivoting angle, i.e. the deflection of the rotational element 25 is greater than that of the drive lever 15.

The rotational movement of the rotational element 25 causes one spring end of the coupling spring 41 to be carried along by the first spring support 43. This spring end then does not have any contact either with the carrier plate 37 or with the housing 11. As a result, the first spring support 43 on the rotational element 25 undergoes a certain preliminary movement in relation to the second spring support 45 on the carrier plate 37. In order to keep the empty travel during the engagement process (described below) as small as possible, the carrier plate 37 is to remain stationary in a fixed position during the coupling process. This is achieved by the braking torque, which is produced between the spring shackle 47 and the housing 11 on the basis of friction, acting on the carrier plate 37 and is greater than the torque which acts on the carrier plate 37 during the engagement process.

The rotational movement of the rotational element 25 also causes the beginning of the engagement process. The control contour 31 of the rotational element 25 rotates in the circumferential direction relative to the sliding element 35, so that, as a result of the slope, a radial force component is transmitted to the adjacent cam 33 of the sliding element 35. This causes the sliding element 35 to be pressed radially outwards counter to the force of the sliding-element spring 49, with the guides 39 of the carrier plate 37 guiding the sliding element 35. The engagement process ends when the sliding element 35 passes into engagement with the teeth 53 of the drive wheel 51. Upon further rotational movement of the rotational element 25, the carrier plate 37 and, in particular, the drive wheel 51 are rotated. That is, the force necessary in order to produce this rotational movement transfers from the drive lever 15, after a step-up by means of the rotational element 25, to the sliding element 35, and from the sliding element further to the drive wheel 51.

If the torque of the drive wheel 51 is not too large, it carries along the overload ring 55 via the leaf springs 57. If, however, a limit load, which is defined by the frictional connection of the leaf springs 57, is exceeded, the arrangement acts as an overload safeguard, i.e. the leaf springs 57 become detached from the drive wheel 51, so that the latter spins with no load. By means of this overload safeguard, and since the drive 1 is not loaded in the event of a crash, it is possible to manufacture most of the components from cost-effective plastic. If the overload ring 55 experiences a torque from the drive wheel 51 in a normal situation (i.e., not an overload situation), the overload ring uses the compensating element 59 to rotate the output element 63 which, in turn, drives the gear 7.

When the end position of the deflection is reached, the drive lever 15 is returned to the neutral position via the lever arm 23 or is released, with, in the latter case, the restoring spring 65 ensuring its return to the neutral position. The drive lever 15 rotates the rotational element 25 back via the rolling movement, with the control contour 31 first of all being removed from the cam 33, so that the sliding-element spring 49 can force the sliding element 35 radially inwards, i.e. disengage it. At the same time, the coupling spring 41 also rotates the internal involute 25 and the carrier plate 37 back into the neutral position. Because of the slip-free gear connection, which exists at the torques which are present, between the drive wheel 51 and the gear 7 and a self-locking of the latter, the drive wheel 51 remains stationary until the drive lever 15 has reached the neutral position.

During the subsequent, renewed deflection of the drive lever 15 in the same direction, the drive wheel 51 rotates further, out of its present position, so that a directed rotational movement of the output element 63, and therefore of the gear 7 is produced. A movement of the gear 7 in the other direction by means of the drive 1 according to the invention, which acts on both sides, is achieved by a deflection of the drive lever 15 in the opposite direction.

According to one modification of the first exemplary embodiment, the rotational element 25' acts on the sliding element 35' by means of a control cam 81 which is integrally formed on the rotational element 25', protrudes in the axial direction and engages in a slotted control guide 83 of the sliding element 35'. During the engagement of the sliding element 35' in the drive wheel 51, the control cam 81 slides along the outer slotted-guide contour 83' of the slotted control guide 83, which contour is situated radially further outwards, while it bears, during the disengagement process, against the inner slotted-guide contour 83" which is situated radially further inwards. On the path to the neutral position, the control cam 81 uses a radially projecting tip in the inner slotted-guide contour 83" to press the sliding element 35' radially inwards. In all further details, the modification coincides with the first exemplary embodiment described.

The second exemplary embodiment is identical to the first exemplary embodiment, except where described differently below, for which reason components which are identical and act identically bear reference numbers which are incremented by 100. A drive 101 is provided for a vehicle seat adjuster 103 which, in the present case, serves as a height adjuster of a vehicle seat 105 in a motor vehicle. The drive 101 acts on a gear 107, and in the second exemplary embodiment, the drive 101 more specifically acts on a self-locking gear fitting which moves, via its two fitting parts which can be rotated relative to each other, respectively two parts of the vehicle seat adjuster 103, for example, in the present case, the seat frame and a rocker, relative to each other. The gear 107 blocks a torque on the output side, i.e. from the side of the vehicle seat adjuster 103, while a torque on the drive side, i.e. from the drive 101, rotates the gear 107.

The drive 101, of which the neutral position is first of all described, has a half open housing 111 which defines a cylindrical construction space. In the center of this construction space, a bearing sleeve 113 is integrally formed on the housing 111 and defines a main axis A together with the cylindrical coordinates used below. A drive lever 115 is mounted in the housing 111 in a manner such that it can pivot about a secondary axis B by means of an integrally formed bearing journal 117, which is arranged offset parallel to the bearing sleeve 113. The drive lever 115 surrounds the bearing sleeve 113 with a lot of play by means of a first cut-out 119. On that side of the first cut-out 119 which faces away from the bearing journal 117, the edge of the first cut-out 119 is formed symmetrically with respect to the longitudinal direction of the drive lever 115 to form a toothed external involute 121. A lever arm 123, for example protruding radially, is fastened to the drive lever 115 as an extension and to actuate it.

In the area that is to the side of the drive lever 115 which faces axially away from the housing 111, a rotational element 125 is mounted rotatably on the bearing sleeve 113, i.e. the drive lever 115 and rotational element 125 are mounted on different axes. In order to form a toothed geometry with involutes between the drive lever 115 and the rotational element 125, the rotational element 125 has an internal involute 127 which bears at a contact point 129 against the associated external involute 121. A semicircular, toothed control wheel 130 is arranged on that side of the rotational element 125 which faces axially away from the drive lever 115. At the end facing away from the internal involute 127, the rotational element 125 has a bent, fork-shaped control contour 131 having two splines. The rotational element 125 uses this control contour 131 to act, in a manner described more precisely later, on a cam 133 with a sliding element 135 which can be moved in a translatory manner.

With a second cut-out 135a, the sliding element 135 surrounds, in addition to the bearing sleeve 113, a control cam 130a of the control wheel 130. In this case, the second cut-out 135a has two control slopes 135b running virtually at right angles to each other. A control segment 136, which is curved slightly about the secondary axis B, is provided in the same plane as the control wheel 130 and is attached fixedly to the drive lever 115. The control wheel 130 and the control segment 136 form control teeth.

In the area that is to the side of the control wheel 130 which faces axially away from the rotational element 125, a disc-shaped carrier plate 137 is likewise mounted rotatably on the bearing sleeve 113. The carrier plate 137 has two radially running, laterally integrally formed guides 139 for the sliding element 135 which can be moved in the radial direction. In the area that is to the side of the carrier plate 137 which faces axially away from the control wheel 130, a drive wheel 151, which is designed as a toothed ring, is mounted rotatably on the bearing sleeve 113. The drive wheel 151 is of partially hollow design on both sides and therefore engages over the carrier plate 137, the control wheel 130, the control segment 136 and the rotational element 125. Teeth 153 are formed on the resultantly defined inner wall of the drive wheel 151. Teeth of the sliding element 135 can interact with the teeth 153 of the drive wheel 151, but, in the neutral position, the sliding element 135 is spaced apart from the teeth 153 of the drive wheel 151.

A cover 161, which is screwed or connected fixedly in some other way to the housing 111, is arranged on that side of the drive wheel 151 which faces axially away from the carrier plate 137. An output element 163, which is arranged within the bearing sleeve 113 and is designed as a short shaft, is connected in a rotationally fixed manner to the drive wheel 151 by means of an overload safeguard (not illustrated) if the torques are not too large, and sits with its other end in a rotationally fixed manner in the gear 107.

The drive 101 is preassembled and then placed together with the output element 163 onto the gear 107 and connected to the latter, for which purpose fastening regions are preferably provided on the housing 111.

Figure 11:
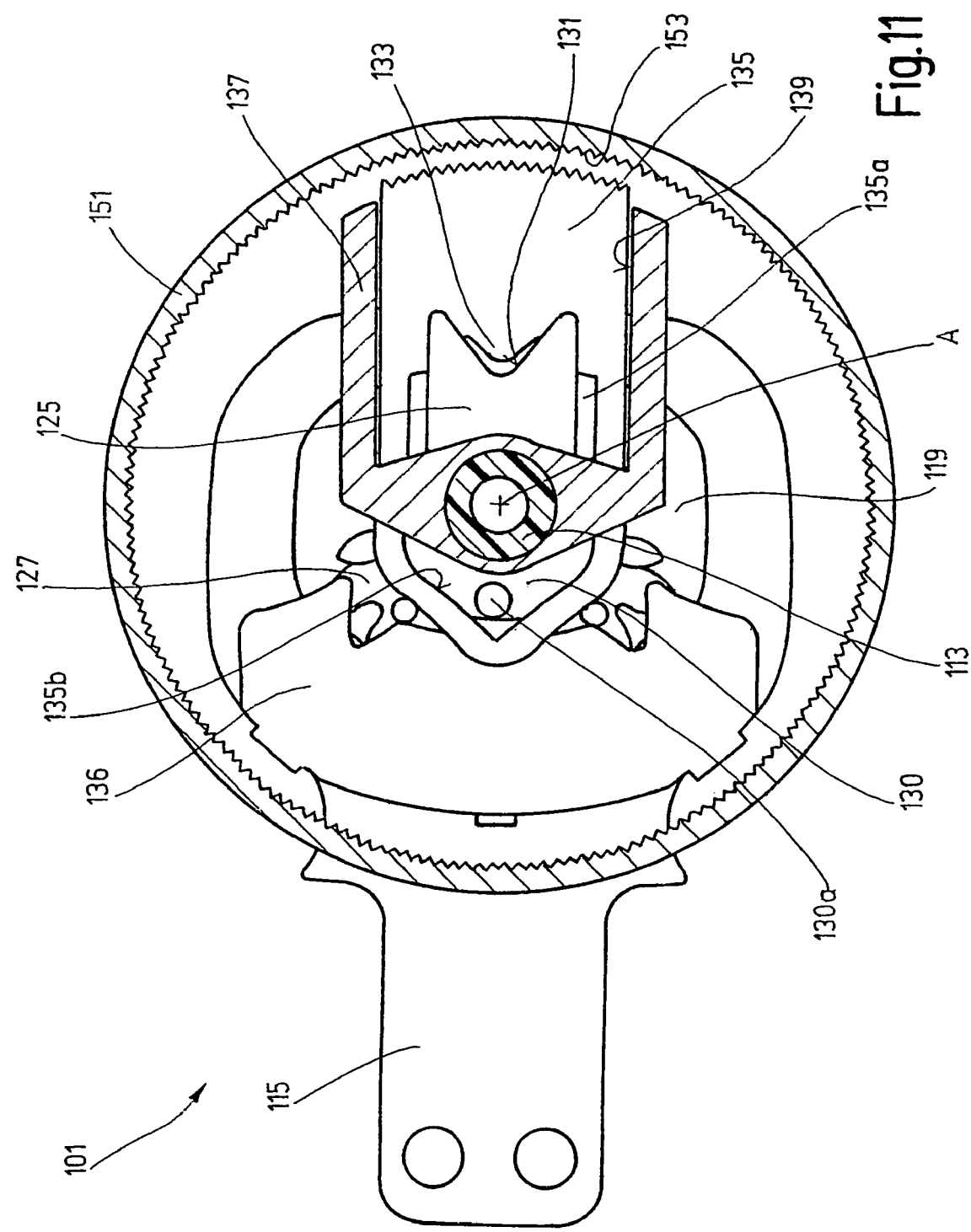
FIG. 11 is a simplified view, illustrated partially cutaway, of the second exemplary embodiment in the zero position.
Figure 12:
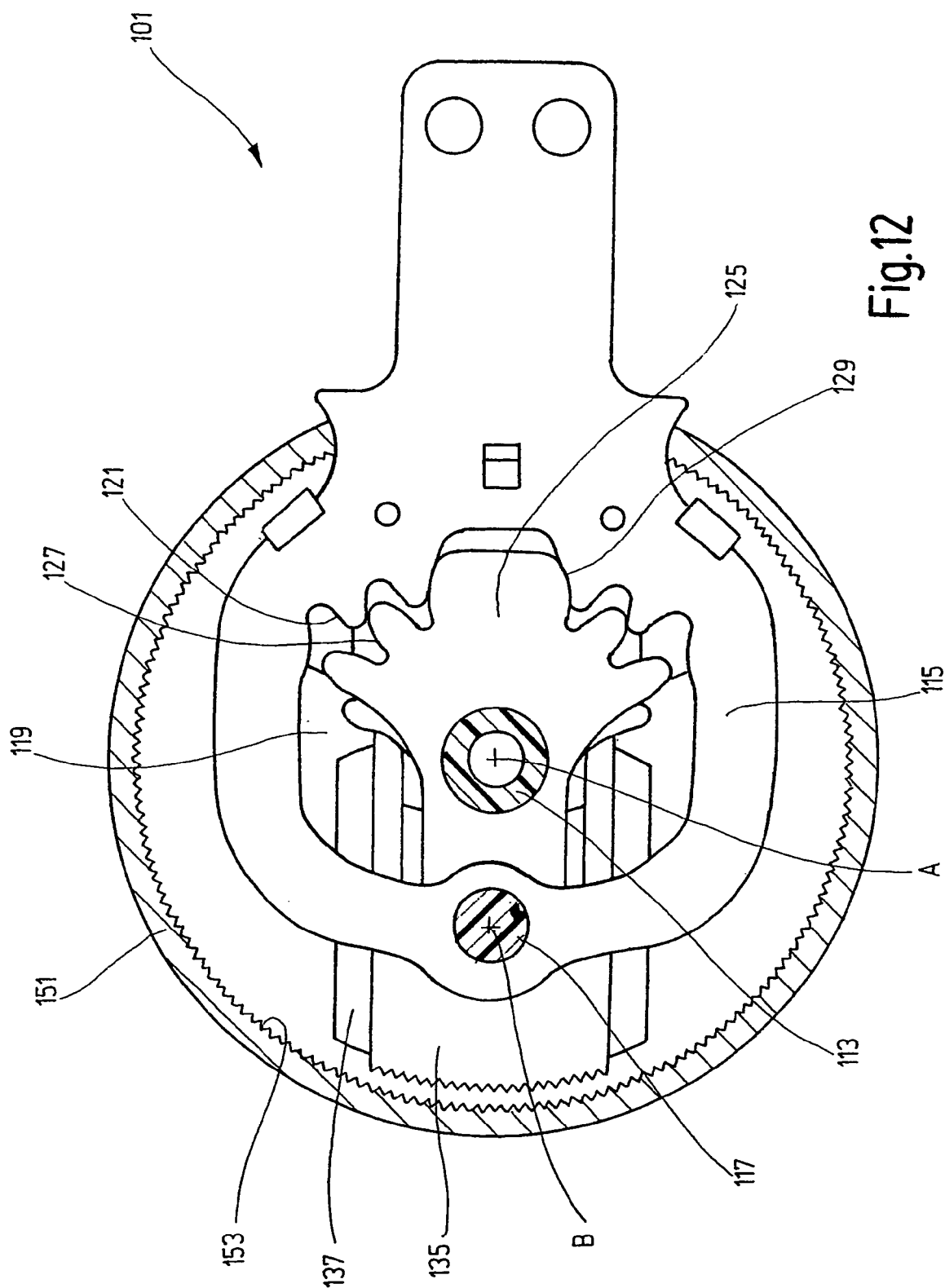
FIG. 12 is a view corresponding to FIG. 11 from the opposite viewing direction.

The drive 101 can be used to step up a pumping (e.g., back and forth) movement of the lever arm 123 of the drive lever 115 and convert it into a directed rotational movement of the gear 107. The neutral position is illustrated in FIGS. 11 and 12. When the drive lever 115 is deflected, it pivots about the secondary axis B. As a result of its shape, the internal involute 127 executes a rolling movement on the external involute 121, in which case the contact point 129 migrates and the rotational element 125 rotates about the main axis A. The selected dimensioning results in a step-up in the pivoting angle, i.e. the deflection of the rotational element 125 is greater than that of the drive lever 115.

Figure 13:
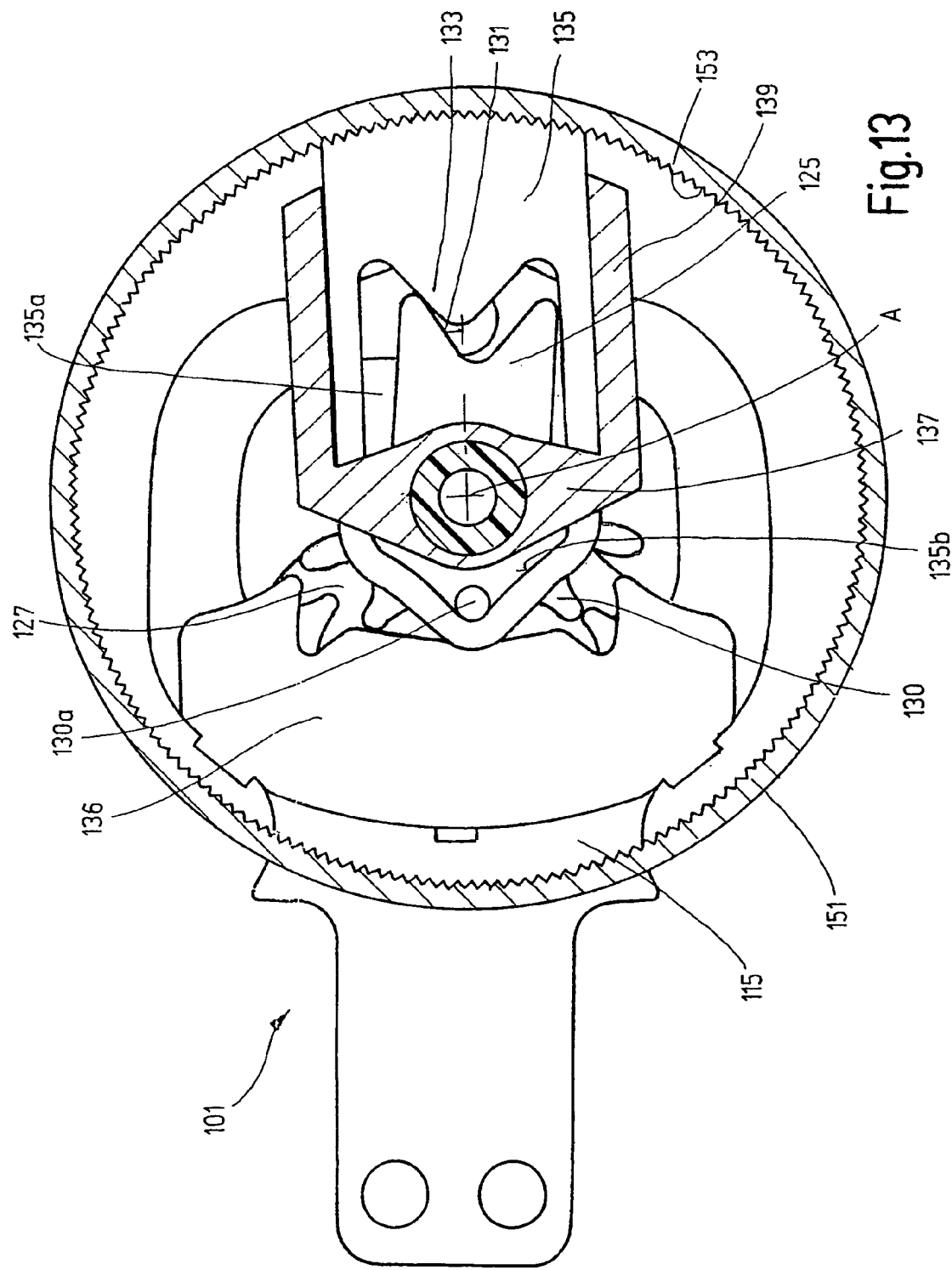
FIG. 13 is a view corresponding to FIGS. 11 and 12 in an engaged, somewhat deflected intermediate position.
Figure 14:
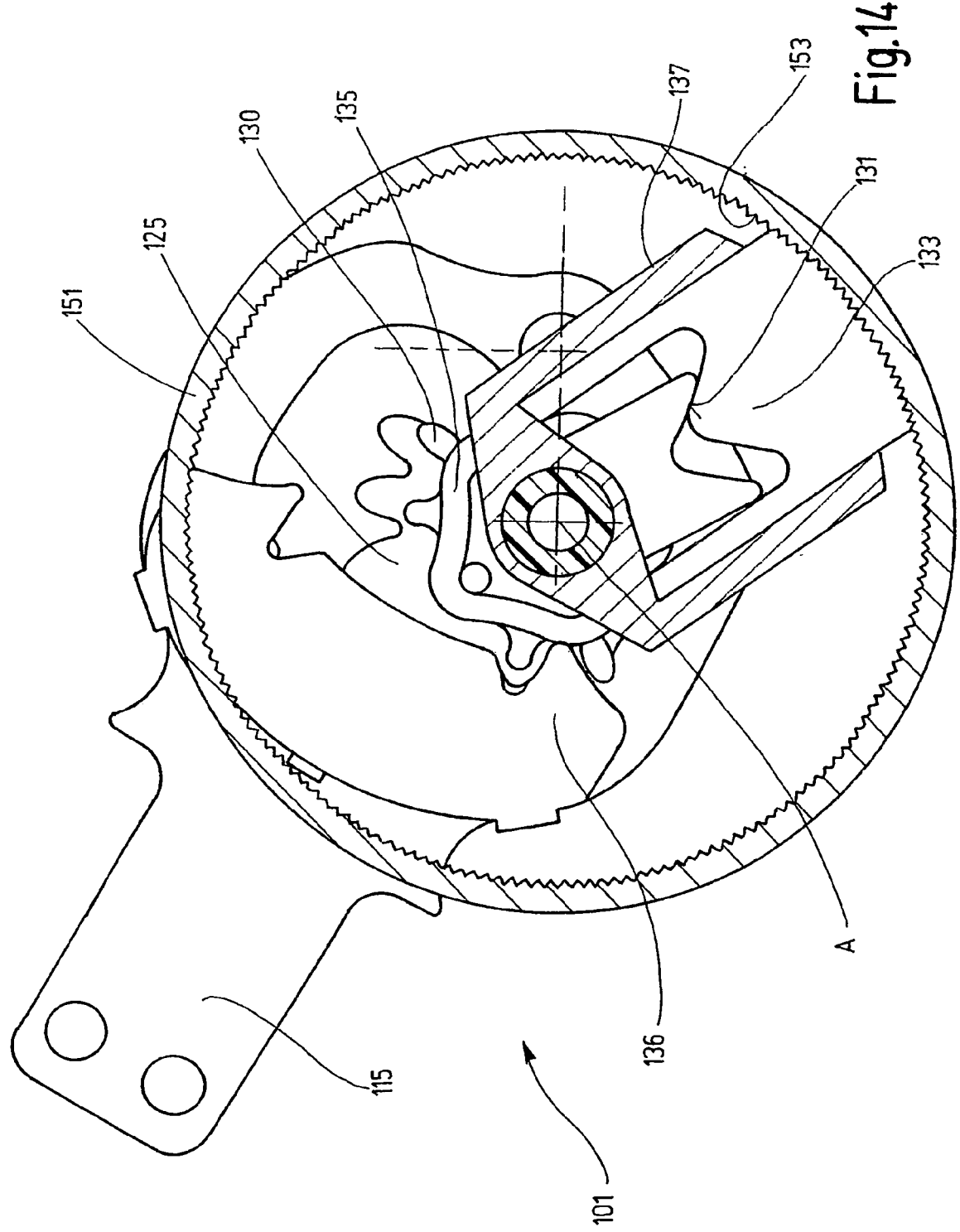
FIG. 14 is a view corresponding to FIG. 13 in the end position.
Figure 15:
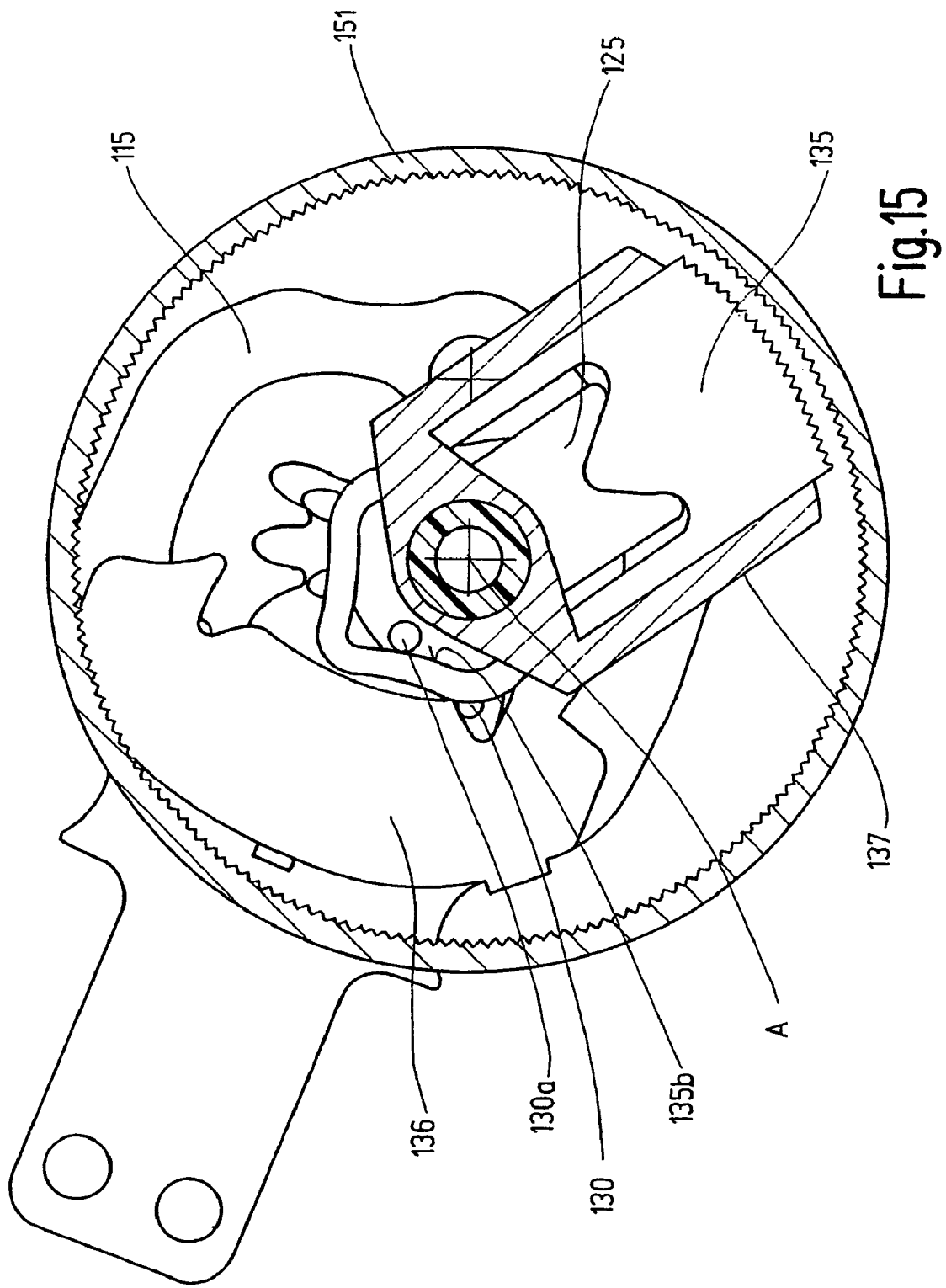
FIG. 15 is a view corresponding to FIG. 14 in a disengaged, greatly deflected intermediate position.
Figure 17:
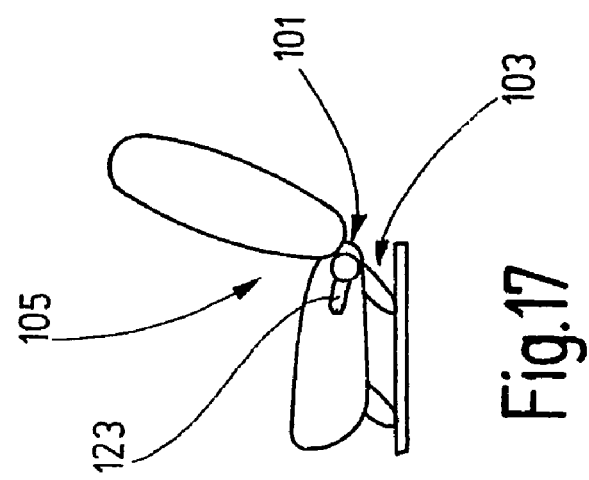
FIG. 17 is a schematic side view of a vehicle seat.
Figure 16:
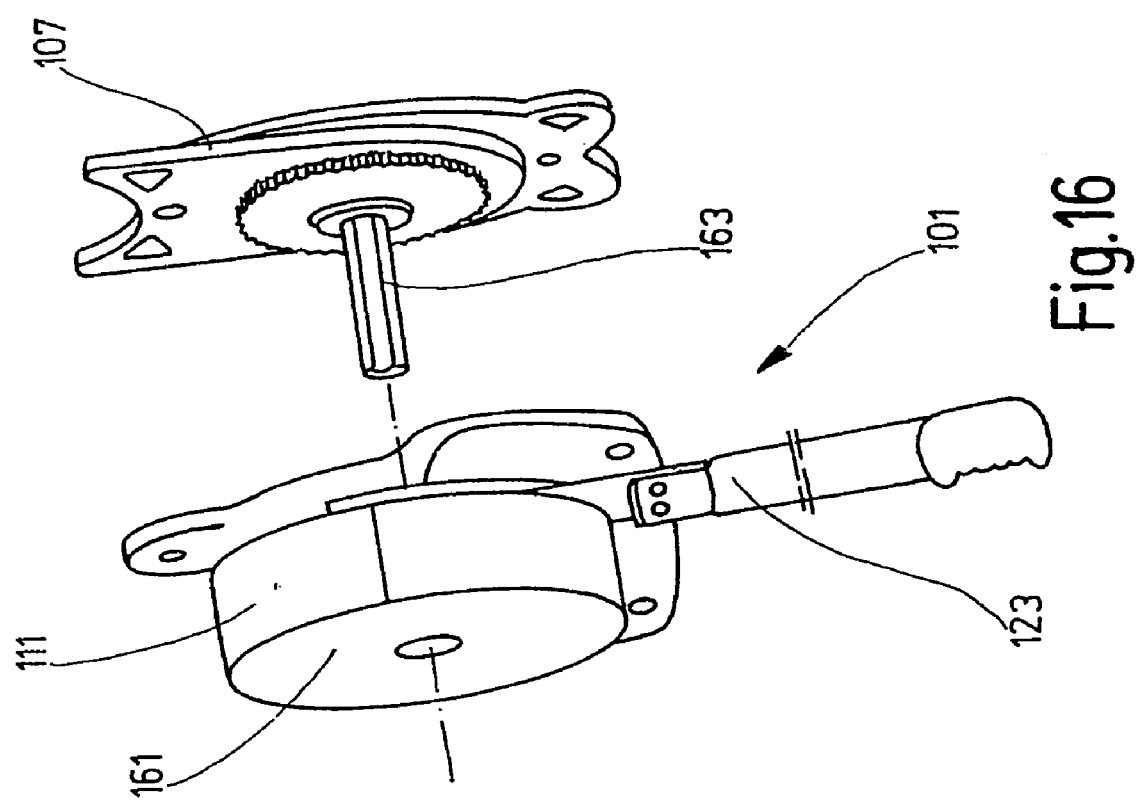
FIG. 16 is a perspective view of the second exemplary embodiment together with the output element and gear.

The rotational movement of the rotational element 125 also brings about the beginning of the engagement process. The control contour 131 of the rotational element 125 rotates in the circumferential direction relative to the sliding element 135, so that, as a result of the slope, a radial force component is transmitted to the adjacent cam 133 of the sliding element 135. The sliding element 135 is thereby pressed radially outwards, with the guides 139 of the carrier plate 137 guiding the sliding element 135. The carrier plate 137 is held in its position by a braking torque. The engagement process ends when the sliding element 135 enters into engagement with the teeth 153 of the drive wheel 151, as illustrated in FIG. 13. The control cam 130a is situated precisely between the two control slopes 135b. Upon further rotational movement of the rotational element 125 about the main axis A, the carrier plate 137 and the drive wheel 151 are also rotated, i.e. the force transfers from the drive lever 115 (via the rotational element 125) to the sliding element 135 and onto the drive wheel 151. The latter rotates the output element 163 about the main axis A, and the output element, in turn, drives the gear 107. The control wheel 130 and the control segment 136 remain disengaged. The end position of the deflection is illustrated in FIG. 14.

At the latest when the end position is reached or in an intermediate position between the neutral position and the end position, the drive lever 115 is released and returned into the neutral position by a spring acting upon it. The control segment 136 now drives the control wheel 130. Via that control slope 135b which is positioned closer to the neutral position, the sliding element 135 is pulled out of the teeth 153 of the drive wheel 151 by means of the control cam 130a, i.e. the sliding element 135 is disengaged. The rotational element 125 is rotated back by means of the cam 133 and the control contour 131. Because of the slip-free gear connection, which exists at the torques which are present, between the drive wheel 151 and the gear 107 and the self-locking of the latter, the drive wheel 151 remains stationary until the drive lever 115 has reached the neutral position.

During the subsequent, renewed deflection of the drive lever 115 in the same direction, the drive wheel 151 rotates further out of this assumed position, so that a directed rotational movement of the output element 163, and therefore of the gear 107, is produced. A movement of the gear 107 in the other direction by means of the drive 101 according to the invention, which acts on both sides, is achieved by a deflection of the drive lever 115 in the opposite direction.

That which is claimed:

1. A drive for a vehicle seat adjuster, the drive comprising:
   at least one sliding element mounted for moving in a translatory manner into engagement with a drive wheel in response to a drive lever being pivoted, wherein the drive lever is mounted for being manually pivoted relative to the sliding element, and an output element is mounted for rotating in response to the drive lever being pivoted while the sliding element is in engagement with the drive wheel; and
   a rotational element that is in contact with the sliding element and is mounted for rotating in response to the drive lever being pivoted.

2. The drive according to claim 1, further comprising a guide for guiding movement of the sliding element in a radial direction, wherein the drive wheel rotates about an axis in response to the drive lever being pivoted while the sliding element is in engagement with the drive wheel, and the radial direction extends outwardly from the axis.

3. The drive according to claim 2, further comprising an overload safeguard that is between the drive wheel and the output element for separating the drive wheel from the output element in response to a predetermined load being exceeded.

4. The drive according to claim 2, further comprising control teeth for disengaging the sliding element from the drive wheel while the drive lever is returned from a deflected position to a neutral position.

5. The drive according to claim 4, wherein the control teeth are respectively defined by:
   a control segment that is connected to the drive lever, and
   a rotatable control wheel.

6. The drive according to claim 5, wherein the control wheel operatively contacts the sliding element by way of a control cam and a control slope, and wherein the control wheel is operative for rotating and thereby pulling, by way of the control cam and the control slope, the sliding element away from the drive wheel.

7. The drive according to claim 1, wherein:
   the rotational element is operative for moving the sliding element radially outwards while the rotational element rotates in a first direction, and
   the sliding element is operative for causing the rotational element to rotate in a second direction, which is opposite to the first direction, while the sliding element moves radially inwards.

8. The drive according to claim 1, further comprising one or more springs for biasing one or more of the sliding element, the rotational element, and the drive lever toward respective neutral positions.

9. The drive according to claim 8, further comprising an overload safeguard that is between the drive wheel and the output element for separating the drive wheel from the output element in response to a predetermined load being exceeded.

10. The drive according to claim 1, wherein a toothed geometry is defined between the drive lever and the rotational element, the drive lever acts on the rotational element via the toothed geometry, and the toothed geometry is for causing the rotational element to rotate in response to the drive lever being pivoted.

11. The drive according to claim 1, wherein the rotational element has a control part for converting rotational movement of the rotational element into translatory movement of the sliding element.

12. The drive according to claim 11, wherein the control part of the rotational element comprises a control cam.

13. The drive according to claim 11, wherein the control part of the rotational element comprises a control contour.

14. The drive according to claim 1, further comprising a spring for biasing the sliding element toward a neutral position.

15. The drive according to claim 1, further comprising a spring for biasing the rotational element toward a neutral position.

16. The drive according to claim 1, further comprising a spring for biasing the drive lever toward a neutral position.

17. A drive for a vehicle seat adjuster, the drive comprising:
   at least one sliding element mounted for moving in a translatory manner into engagement with a drive wheel in response to a drive lever being pivoted, wherein the drive lever is mounted for being manually pivoted relative to the sliding element, and an output element is mounted for rotating in response to the drive lever being pivoted while the sliding element is in engagement with the drive wheel;
   a guide for guiding movement of the sliding element in a radial direction, wherein the drive wheel rotates about an axis in response to the drive lever being pivoted while the sliding element is in engagement with the drive wheel, and the radial direction extends outwardly from the axis; and
   means for frictionally holding a carrier plate in a fixed position while the sliding element moves in the translatory manner into engagement with the drive wheel, wherein the guide is part of the carrier plate.

18. The drive according to claim 17, further comprising a rotational element that is in contact with the sliding element and is mounted for rotating in response to the drive lever being pivoted.

19. A drive for a vehicle seat adjuster, the drive comprising:
   at least one sliding element mounted for moving in a translatory manner into engagement with a drive wheel in response to a drive lever being pivoted, wherein the drive lever is mounted for being manually pivoted relative to the sliding element, and an output element is mounted for rotating in response to the drive lever being pivoted while the sliding element is in engagement with the drive wheel; and
   control teeth for disengaging the sliding element from the drive wheel while the drive lever is returned from a deflected position to a neutral position.

20. The drive according to claim 19, wherein the control teeth are respectively defined by:
   a control segment that is connected to the drive lever, and
   a rotatable control wheel.

21. The drive according to claim 20, wherein the control wheel operatively contacts the sliding element by way of a control cam and a control slope.

22. The drive according to claim 21, wherein the control wheel is operative for rotating and thereby pulling, by way of the control cam and the control slope, the sliding element away from the drive wheel.

23. A drive for a vehicle seat adjuster, the drive comprising:
   at least one sliding element mounted for moving in a translatory manner into engagement with a drive wheel in response to a drive lever being pivoted, wherein the drive lever is mounted for being manually pivoted relative to the sliding element, and an output element is mounted for rotating in response to the drive lever being pivoted while the sliding element is in engagement with the drive wheel; and
   an overload safeguard that is between the drive wheel and the output element for separating the drive wheel from the output element in response to a predetermined load being exceeded.

24. A drive for a vehicle seat adjuster, the drive comprising:
   at least one sliding element mounted for moving in a translatory manner into engagement with a drive wheel in response to a drive lever being pivoted, wherein the drive lever is mounted for being manually pivoted relative to the sliding element, and an output element is mounted for rotating in response to the drive lever being pivoted while the sliding element is in engagement with the drive wheel, and wherein the drive drives a self-locking gear.

25. A combination, comprising:
   a drive including at least one sliding element mounted for moving in a translatory manner into engagement with a drive wheel in response to a drive lever being pivoted, wherein the drive lever is mounted for being manually pivoted relative to the sliding element, and an output element is mounted for rotating in response to the drive lever being pivoted while the sliding element is in engagement with the drive wheel; and
   a vehicle seat, wherein the drive drives a height adjuster of the vehicle seat.

* * * * *